United States Patent
Tkac et al.

(10) Patent No.: US 10,445,223 B1
(45) Date of Patent: Oct. 15, 2019

(54) SERVICE VIRTUALIZATION PLATFORM

(71) Applicant: Capital One Services, LLC, McLean, VA (US)

(72) Inventors: Stephen Tkac, Glen Allen, VA (US); Agnibrata Nayak, Henrico, VA (US); Pradosh Sivadoss, Broadlands, VA (US); Govind Pande, Chantilly, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/170,785

(22) Filed: Oct. 25, 2018

(51) Int. Cl.
    G06F 11/36  (2006.01)
    G06F 9/455  (2018.01)
    G06F 9/445  (2018.01)

(52) U.S. Cl.
    CPC ...... G06F 11/3664 (2013.01); G06F 9/44526 (2013.01); G06F 9/455 (2013.01); G06F 11/3696 (2013.01)

(58) Field of Classification Search
    CPC .. G06F 11/3664; G06F 9/455; G06F 9/44526; G06F 11/3696
    USPC ................................................. 717/124–135
    See application file for complete search history.

(56) References Cited

U.S. PATENT DOCUMENTS

| | | | |
|---|---|---|---|
| 8,225,317 B1* | 7/2012 | Chiueh | G06F 9/455 713/164 |
| 9,110,732 B1* | 8/2015 | Forschmiedt | G06F 9/44505 |
| 9,672,081 B1* | 6/2017 | Esparza | G06F 9/541 |
| 10,152,211 B2* | 12/2018 | Koushik | H04L 63/10 |
| 2014/0012900 A1* | 1/2014 | Janedittakarn | H04L 63/08 709/203 |
| 2014/0137112 A1* | 5/2014 | Rigolet | G06F 9/45558 718/1 |
| 2015/0381756 A1* | 12/2015 | Lotfallah | H04L 67/2814 726/4 |
| 2016/0132309 A1 | 5/2016 | Rajasekhar et al. | |
| 2017/0070594 A1 | 3/2017 | Oetting et al. | |
| 2017/0272504 A1* | 9/2017 | Cahill | G06F 16/387 |
| 2017/0364382 A1* | 12/2017 | Zhou | G06F 8/65 |
| 2017/0371926 A1* | 12/2017 | Shiran | G06F 16/24524 |
| 2018/0052723 A1* | 2/2018 | Yim | G06F 8/41 |
| 2018/0210745 A1* | 7/2018 | Raheja | G06F 11/3688 |
| 2018/0341508 A1* | 11/2018 | Raskar | G06F 9/466 |
| 2018/0374110 A1* | 12/2018 | Burli | G06Q 10/0631 |

* cited by examiner

Primary Examiner — Marina Lee

(57) ABSTRACT

Various embodiments are generally directed to techniques of creating or managing one or more virtual services using at least one application programming interface (API). At a plugin layer, a plugin integrator programmatically interfaces with and integrates one or more virtualization tools. The plugin integrator may be programmatically interfaced with the at least one API. At least one proxy agent may be used to run or consumer the one or more virtual services. The at least one API and the at least one proxy agent may be implemented in an abstraction layer.

19 Claims, 5 Drawing Sheets

SERVICE VIRTUALIZATION PLATFORM

BACKGROUND

Service virtualization relates to emulating the behavior of specific software components in component-based applications, such as application programming interface (API) driven applications, cloud-based applications, or service-oriented architectures. It is used to provide software development and testing teams access to dependent system components that may be otherwise unavailable or difficult to access for development or testing purposes.

Thus, emulating, replicating, and/or copying the software components may reduce dependency constraints on the development and testing teams in enterprise environments. There are numerous commercial virtualization products available on the market. While these products are generally feature-rich, they lack scalability and the necessary APIs to support cloud enablement without added costs associated with an enterprise license agreement (ELA). Moreover, most, if not all, commercial virtualization products have proprietary formats for supporting the virtual services, which makes the interchangeability and migration between various products extremely difficult. And without an ELA, none of these products provide a cost-effective solution for supporting an enterprise that utilizes numerous virtual services at scale.

Accordingly, there is a need for a high-performing, customizable, scalable, and cost-effective service virtualization platform that eliminates the need for expensive and bloated commercial products.

DETAILED DESCRIPTION

Figure 1:
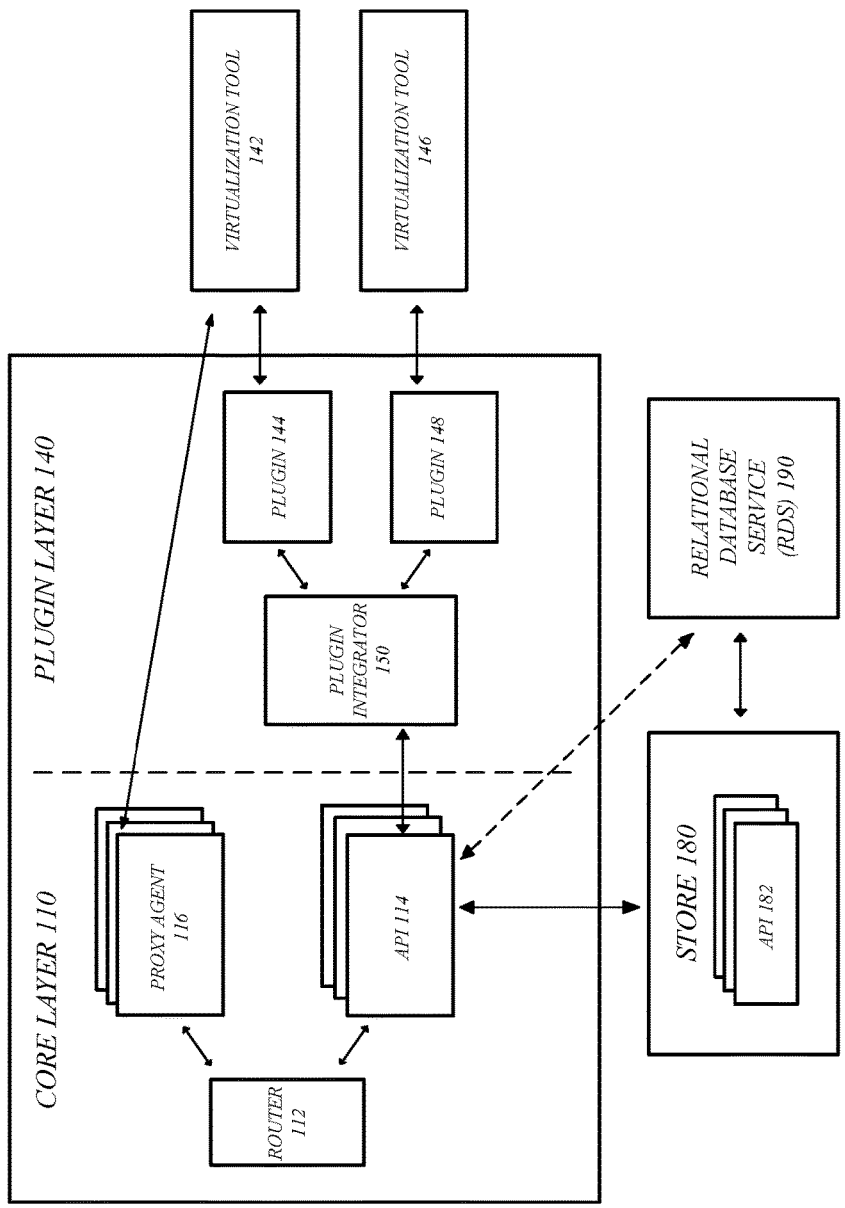
FIG. 1 illustrates an example service virtualization platform in accordance with one or more embodiments.

Various embodiments are generally directed to a service virtualization platform that is at least cloud-native, high-performing, customizable, and scalable. The platform has a pluggable architecture for plugging in one or more virtualization tools, such as a backend open source virtualization tool or agent, e.g., Mountebank, Hoverfly, WireMock, etc. The plugged-in tools may be integrated at a plugin layer and programmatically interfaced with or programmatically connected to at least one core-layer API, which may be used to create, modify, manage, and/or deploy one or more virtual services. Thus, the pluggable architecture of the platform allows for numerous virtualization tools, and different types thereof, to be utilized and scaled based on user load or customer need. Moreover, the service virtualization platform includes at least one proxy agent for consuming the one or more virtual services, and in examples, does not handle any API logic. In that regard, the proxy agent may be lightweight, handle minimal processing, and may not have any API-related overhead. The proxy agent is also scalable based on user load and customer need.

According to embodiments, the service virtualization platform may include at least two different layers: a plugin layer and a core layer. For example, one or more virtualization tools may be plugged in at the plugin layer, all of which may be integrated by a plugin integrator. The core layer may include at least one core-layer API (hereinafter referred to as core API), which may be programmatically interfaced with the plugin integrator, and optionally, the core API may also be programmatically interfaced with a storage device and/or a relational database service. Moreover, the core layer may include at least one proxy agent. As will be further described below, the core layer may be an abstraction layer, which may hide the implementation details of the plugin features at the plugin layer, e.g., what types of virtualization tools are plugged in, how many are plugged in, the functionalities of the tools themselves, etc.

In examples, the at least one core API may be used to create or manage a virtual service (or virtual services). Separately, the at least one proxy agent may be configured solely to consume the virtual service. To that end, the processing related to the creation and management of the virtual service and the processing related to the consumption, e.g., running, of the virtual service may be bifurcated and separate from each other, which may increase the overall efficiency and effectiveness of the platform.

As set forth above, in previous solutions, one of the numerous problems with the currently available commercial service virtualization products is that they are rigid, lack scalability, and expensive. The above-described embodiments and examples described herein are advantageous over the previous solutions in numerous ways. For example, the pluggable architecture of the service virtualization platform allows for a core API (or APIs) to create and/or manage a virtual service in a customizable, flexible, scalable manner. By integrating, for example, multiple (and/or different types of) open source virtualization tools at the plugin layer, the platform can mix and match different functionalities of the virtualization tools, which allows for greater flexibility and customizability. Moreover, a proxy agent at the core layer may separately run the virtual services after they have been created and managed by the core APIs, thereby allowing the proxy agent to be lightweight and scalable based on user load and customer need. Accordingly, the need for bloated, expensive, and inflexible commercial service virtualization products is obviated.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example service virtualization platform 100 according to one or more embodiments. As will be further discussed below, one or more computing devices, or processing circuitry thereof, may be operable to execute instructions that provide and support the service virtualization platform 100 including all the components therein.

As shown, the platform 100 includes a core layer 110 and a plugin layer 140. The core layer 110 includes a router 112, at least one core API 114 (where the additional APIs are represented by the cascaded blocks arranged behind core API 114), and at least one proxy agent 116 (where the additional proxy agents are represented by the cascaded blocks located behind proxy agent 116). As further shown, the plugin layer 140 includes a virtualization tool 142 that is pluggable, or plugged, into a plugin integrator 150 via plugin 144. Similarly, a virtualization tool 146 is pluggable, or plugged, into the plugin integrator 150 via plugin 148. While only virtualization tools 142 and 146 are shown, it may be understood that additional virtualization tools may be plugged-in and integrated. Moreover, although the plugins 144 and 148 are illustrated as separate components from the virtualization tools 142 and 146, the plugins may be part of or provided with the virtualization tools themselves.

The virtualization tools 142 and 146 may be any suitable tool that provides functionalities or services for testing or emulating a software component, e.g., an application, a file, code, etc. In embodiments, a virtualization tool may be an open source tool. For example, the virtualization tool 142 may be Mountebank, which is an open source tool that provides cross-platform, multi-platform test doubles and employs imposters to act as on-demand test doubles. In another example, the virtualization tool 146 may be Hoverfly, which is a tool that allows users to stub and/or simulate HTTP(S) services. It is a proxy written in the Go programming language and responds to HTTP(S) requests with stored responses—pretending to be its true counterpart. Yet another example of a virtualization tool is WireMock, which is a simulator for HTTP-based APIs and supports testing of edge cases and failure modes that the real API may not reliably produce.

Because each of the virtualization tools 142 and 146 may have their own native structure, may not have the support for necessary connections, may involve complex integration to support various connections (e.g., two-way Secure Socket Layer (SSL) connectivity), or encompass different functionalities, the plugin integrator 150 may be used to integrate all of the plugged-in virtualization tools and their respective functionalities in an interconnected, organized, and cohesive manner. Each virtualization tool, by itself, may exhibit some basic functionalities, but none may solely encompass enough functionality to holistically replace a commercial product. Thus, the service virtualization platform 100 may be customized in that different virtualization tools, e.g., virtualization tools 142 and 148, and their respective functionalities may be mixed, matched, and/or easily plugged-in at the plugin layer 140, at scale, to meet various user or customer needs. The plugin integrator 150 may provide the necessary services that the plugins 144 and 148 can use, including a way for the plug-ins to register themselves with the plugin integrator 150 and one or more protocols for exchanging data with the plugins 144 and 148. Moreover, the number and types of the virtualization tools are scalable.

As illustrated in FIG. 1, the plugin integrator 150 may be programmatically interfaced with or programmatically connected to the at least core API 114, which allows the core API 114 to access and interface with the virtualization tools 142 and 146. In examples, as shown, the plugin integration is not programmatically interfaced with the at least one proxy agent. It may be understood that the terms programmatically interface/interfaced/interfacing with or programmatically connect/connected/connecting to are interpreted broadly and may be understood to connect with or interact with at a programming level and/or hardware level.

The at least one API 114 may be used to create, deploy, and/or manage one or more virtual services by programmatically communicating with the plugged-in virtualization tools 142 and 146 via the plugin integrator 150, the details of which will be further described below. For example, a virtual service may be a copied or replicated service that allows users to dynamically extend, modify, test, edit, reconfigure, capture data, record, set delays, simulate, etc. the behavior of existing services or applications and components and characteristics related thereto. According to embodiments, the API 114 is robust and is not required to be scaled since the features that it may use and/or access are scalable via the pluggable architecture of the service virtualization platform 100.

In examples, the core layer 110 may be an abstraction layer, which is a way of hiding or abstracting the implementation details of various functionalities, such as the details related to the plugin layer 140, e.g., how the virtualization tools 142 and 146 work or function, what kind of virtualization tools are plugged-in, etc. In other words, the at least one API 114, for instance, may create, deploy, manage, etc. the one or more virtual services without any knowledge or understanding of the logic or processing implemented at the plugin layer 140.

As shown, the at least one API 114 may connect, interface, or communicate with a storage device 180, which may store additional APIs, such as API 182 that the at least one API 114 can call or access. The storage device 180 may interface with a relational database service (RDS) 190. Optionally, the at least one API may directly interface with RDS 190. The RDS 190 may provide additional support for the service virtualization platform 100. For example, virtual service data associated with the one or more virtual services created or managed by the at least one API 114 may be exported and stored in the RDS 190 for performing further analysis thereon. The virtual service data may be in JavaScript Object Notation (JSON) format and may be formattable in Git. For instance, various types of machine learning may be applied on the data. The results of the machine learning and analysis may be relayed back to the service virtualization platform 100 to improve or modify various aspects of the virtualization service, e.g., improving the simulation of delay, improving the randomization of delay, etc.

As further shown in FIG. 1, the core layer 110 also includes the at least one proxy agent 116, which may be a network management component, having—for instance—at least routing capabilities, that allows for management by proxy. For example, the proxy agent 116 may route a request to an appropriate port of the virtualization tool so that the virtualization tool appears as if it is the platform 100 (or the server supporting the platform 100) itself. It may be understood that the proxy agent may have different functions for different purposes and may include any suitable proxy agent including but not limited to Simple Network Management Protocol (SNMP) proxy agents, Windows Internet Name Service (WINS) proxy agents, Dynamic Host Configuration Protocol (DHCP) proxy agents, and the like.

The at least one proxy agent 116 is configured to consume, e.g., run, execute, operate, etc., the one or more virtual services already created, deployed, and/or managed by the at least one API 114. When running a virtual service, the proxy agent 116 may programmatically interface with or connect to the applicable virtualization tool, which is the virtualization tool 142, as shown in FIG. 1, but may alternatively be or also include the virtualization tool 146. In examples, the proxy agent 116 is configured only to consume—does not handle any API logic and does not have any overhead in terms of creating or managing the APIs. To at least that end, the at least one proxy agent is lightweight and does minimal processing on the consumption request. Moreover, the consumption of the virtual services is scalable by way of the at least one proxy agent based on user load, demand and/or customer need. In that regard, the service virtualization platform 100 has a bifurcated architecture: the at least one API 114 does everything related to virtual service functionality (e.g., create, deploy, manage, modifying, deleting, setting modes, setting triggers, etc.) and the at least one proxy agent separately consumes (e.g., runs, executes, processes, etc.) the virtual services.

Moreover, the service virtualization platform 100 may include a networking device, such as a router 112, as shown. While the router 112 is illustrated as being part of the service virtualization platform 100, it may be understood that the router 112 may reside outside of the platform and is not required to be integrated therein. For example, the router 112 may route users, applications, and/or test frameworks into the platform 100.

The service virtualization platform 100 may support representational state transfer (REST) service virtualization and/or simple object access protocol (SOAP) service virtualization. Thus, for example, the above-described API 114 may be a REST or RESTful API or a SOAP API. Moreover, the service virtualization platform 100 may be easily integrated with any continuation-integration/continuation-delivery (CI/CD) automation pipeline, where the at least one API 114 allows the easy integration.

It may be understood that the service virtualization platform 100 may be a system of one or more connected cloud-native server computers. To at least that end, the platform is lightweight. Moreover, as set forth above, one of the numerous advantages of the above-described service virtualization platform is that it incorporates a customizable, interchangeable, and pluggable architecture to incorporate various service virtualization tools, thereby allowing greater flexibility for numerous users in enterprise environments.

Figure 2:
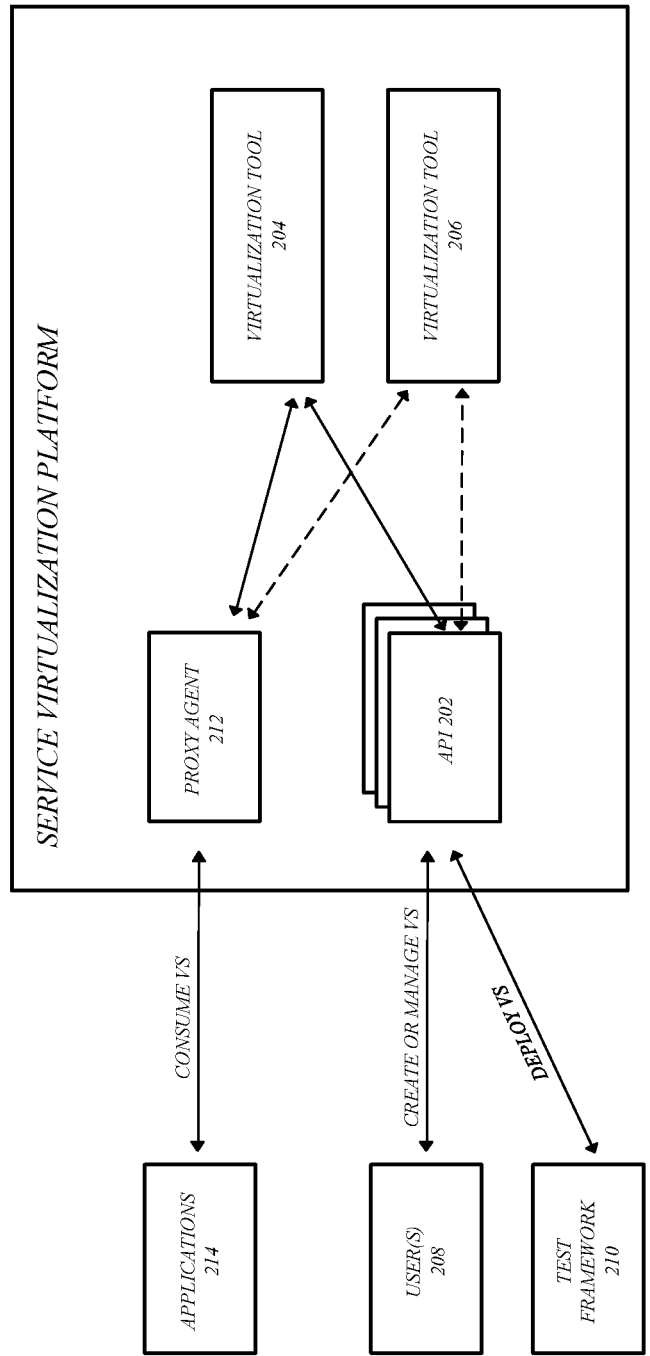
FIG. 2 illustrates example uses of the service virtualization platform in accordance with one or more embodiments.

FIG. 2 illustrates example uses of the service virtualization platform 200 in accordance with one or more embodiments. As shown, the service virtualization platform 200 includes at least one API 202, virtualization tools 204 and 206, and a proxy agent 212. For example, the virtualization tool 204 may interface with API 202 via a plugin integrator (not shown here), as indicated by the solid arrow between those components. Optionally, the virtualization tool 206 may also interface with the API 202, as indicated by the dashed arrow.

As set forth above, one or more virtual services may be created or managed by user(s) 208 via the at least one API 202. For example, the user(s) 208 may be different teams or business units of an enterprise, or may be customers, etc. and the user may utilize an interface (e.g., Swagger interface) to create and manage the virtual services. For instance, the user may design, build, document, and/or manage the virtual services using the interface, where the interface may allow the user to try out or test the at least one API 202 prior to integrating it/them into the virtual service that is created, maintained, or managed.

When creating the virtual services, the interface may be intuitive and may easily allow the user to select and implement various APIs from a menu of APIs in an "a-la-carte" manner. As set forth above, because the API 202 is at the abstraction level, the virtual services may be created and operated by the user without the user specifically knowing how the virtualization tools, e.g., virtualization tools 204, 206, implement or operate the relevant functionalities. For example, a virtual service may be created using API 202, which may interface with and call virtualization tool 204. The users, however, does not have to know how the virtualization tool 204 works, which advantageously renders the process of creating virtual services intuitive, easy, and efficient. Thus, if the user requires a different set of functionalities that virtualization tool 204 does not provide, a different virtualization tool, such as the virtualization tool 206, may be interfaced with or called by the API 202, or alternatively, a different API that calls that virtualization tool may be implanted or used for the creation of the virtual service.

While the service virtualization platform 200 provides the various APIs to create the virtual services, it may be understood that the users may also be involved in creating those APIs to customize how the virtualization tools the APIs are interfaced and called. In at least that regard, the virtualization platform itself is customizable, flexible, and interchangeable, and further, the process of creating virtual services using the service virtualization platform 200 may provide a customizable, flexible, and interchangeable experience for the user.

Upon creating the one or more virtual services, the user 208 may also manage them. In examples, the same interface used to create the virtual services may be used to manage the virtual services. By way of example, management includes capturing or recording virtual service related data at any point, for instance, during a simulation session or the like. Another example of management includes editing, modifying, deleting virtual service data or modifying or editing any suitable aspect of the virtual service itself (e.g., the program file) via the user interface. Moreover, the user can set one or more delays for the virtual service to provide a more realistic simulation of the service that is being mocked, e.g., a randomized delay, a jittered delay (ranging from 100 to 200 milliseconds), back-end delay, etc.

In embodiments, the service virtualization platform 200 may also be managed or configured to enter various modes, such as a simulation mode, a passthrough mode, a record mode, and the like. During the record mode, the platform may record against the traffic that is coming in or out of the platform to record, analyze, and learn the data that is recorded. These modes may be changed by the user 208 via the interface. In further examples, JavaScript (JS) code may be injected or added to code using the interface. For example, the JS code may dynamically modify the behavior the one or more virtual services associated with code (or may modify the behavior of portions of the platform itself) by altering incoming requests and/or the outgoing mocked responses.

Moreover, as shown in FIG. 2, a test framework 210 may deploy one or more virtual services to the at least one API 202. The test framework, for example, may be an automation framework that is a set of guidelines for creating and designing test cases and may include a combination of tools or practices that are designed to help users (e.g., QA users) test more efficiently. In addition to deploying virtual services to the platform 200, the one or more virtual services already created using the at least one API 202 may be automatically and/or dynamically updated, modified, edited, etc. based on data or metrics associated with or generated by the test framework 210.

It may be understood that the term manage may be interpreted broadly and includes any suitable action on the virtual service after it has been created, e.g., controlling, editing, modifying, adding, setting, etc.

As set forth above, a proxy agent, e.g., the proxy agent 212, allows users to consume or run the virtual services created and managed using the at least one API 202. As illustrated, applications 214, which may be run on a computing device, such as a mobile computer, smartphone, laptop, may perform the consumption. For example, if a user desires to consume the above-described virtual service that integrates the functionalities of the virtualization tool 204, the proxy agent 212 may route the applications to the correct virtualization tool, as indicated by the solid arrow connecting the proxy agent 212 and the virtualization tool 204. The proxy agent 212, as illustrated in the example, is configured such that it only consumes the virtual services. The proxy agent, thus, does not create or manage the virtual services, which again, allows the consumption process to be lightweight without having any API-related processing overhead. To that end, the aspects related to the proxy agent 212 and the at least one API 202 are bifurcated, but seamlessly integrated in the service virtualization platform 200 allowing for a positive user experience. Moreover, as set forth above, numerous proxy agents may be utilized at scale to meet user demand and need.

Figure 3:
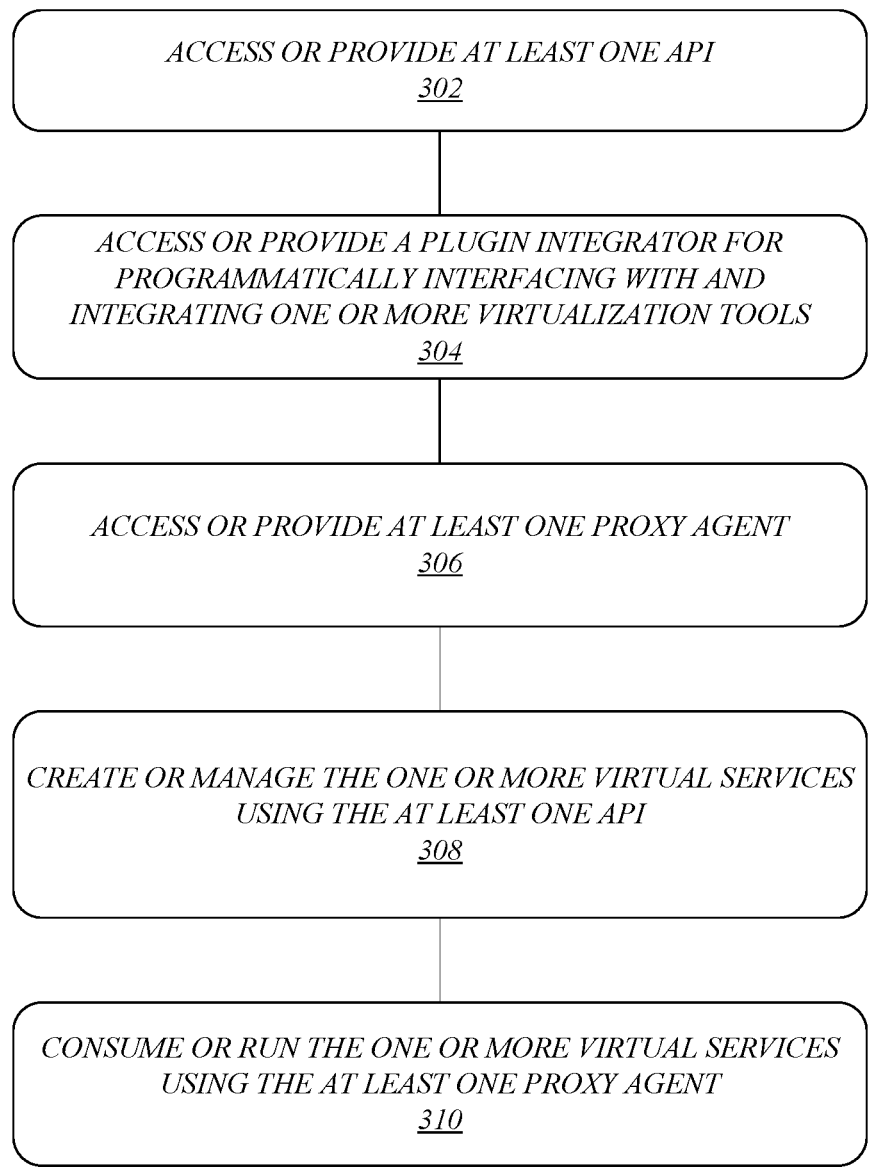
FIG. 3 illustrates an example flow diagram in accordance with one or more embodiments.

FIG. 3 illustrates a flow diagram 300 in accordance with the embodiments. It may be understood that each block illustrated in the flow diagram 300 may be executed or implemented by one or more computing devices, and processing circuitries thereof, which will be further discussed below. Moreover, it will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Further, the blocks are not required to be arranged in any particular order.

In block 302, a service virtualization platform, such as the above-described service virtualization platform 100 and 200, may access or provide at least one API (or core API) for creating or managing one or more virtual services. As set forth above, the APIs allow a user to create and/or manage the one or more virtual services. The APIs may be REST or RESTful APIs or SOAP APIs and the like.

In block 304, the platform may also access or provide a plugin integrator for programmatically interfacing with or programmatically connecting to and integrating one or more virtualization tools (e.g., Mountebank, Hoverfly, etc.) using their respective plugins. The plugin integrator may be programmatically interfaced with the at least one API accessed or provided in block 302. In that regard, this plugin architecture allows various virtualization tools and their functionalities to be mixed-and-matched in a predetermined combination and/or customized depending on the virtualization tool functionalities need or desired for the virtual services.

In block 306, the service virtualization platform may access or provide at least one proxy agent, which is used to consume or run the one or more virtual services created and/or managed in block 304. In examples, the proxy agent is used only to run the virtual services. As set forth above, the proxy agent routes to the appropriate virtualization tools to run the virtual services.

In block 308, the at least API accessed or provided in block 302 is used to create or manage the one or more virtual services. Users may use an interface to create or manage the virtual services. The interface may allow the users to capture and record data, edit, modify, or delete data, set various types of delays, enter various modes including simulation, passthrough, record modes, change modes, and inject JS code to dynamically modify behavior of the virtual services. Moreover, a test framework may be deployed to manage the virtual services. In block 310, after the one or more virtual services have been created and/or modified, the at least one proxy may consume or run the virtual services using the at least one proxy agent, as set forth above.

Figure 4:
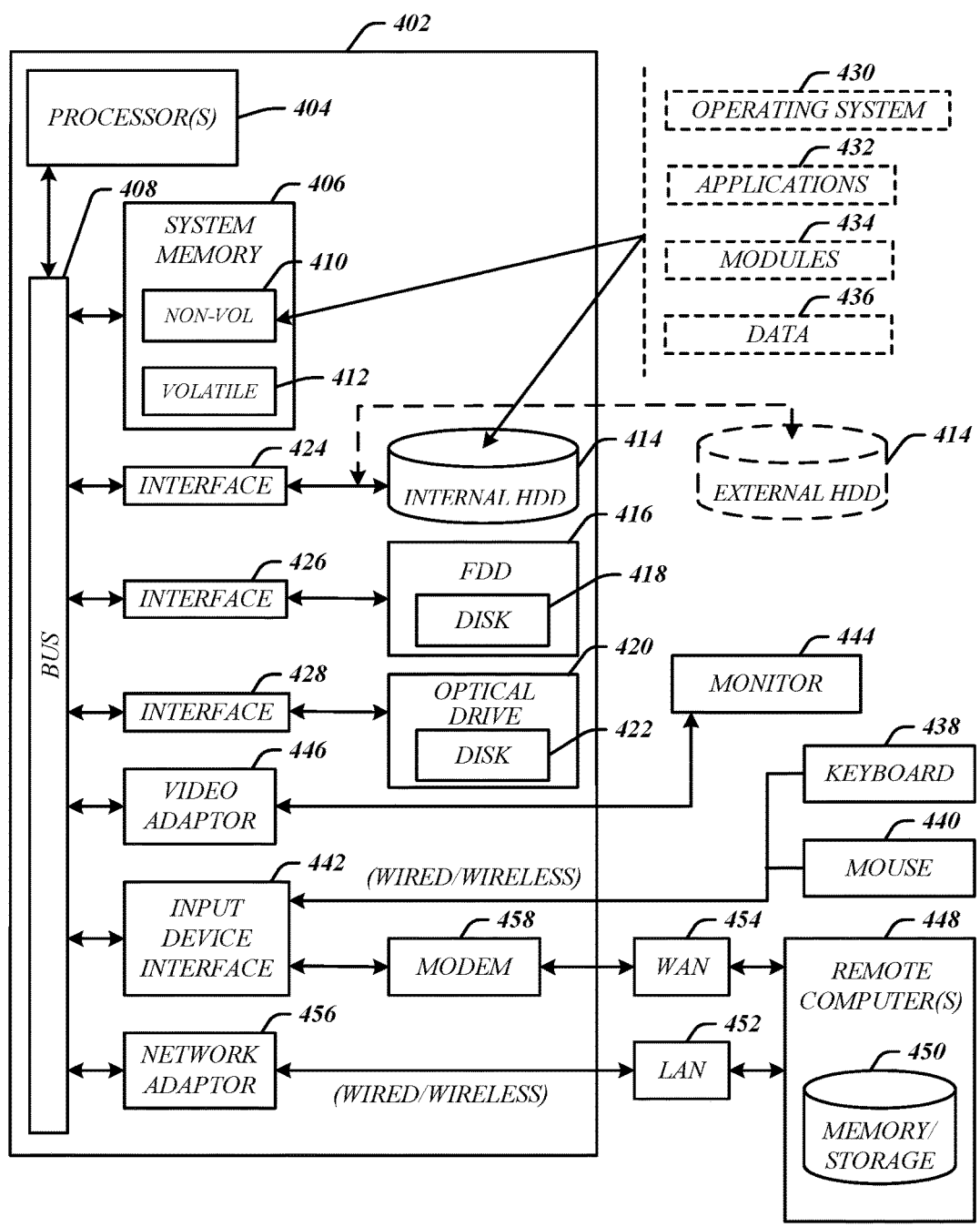
FIG. 4 illustrates an example computing architecture of a computing device in accordance with one or more embodiments.

FIG. 4 illustrates an embodiment of an exemplary computing architecture 400, e.g., of a computing device, such as a desktop computer, laptop, tablet computer, mobile computer, smartphone, etc., suitable for implementing various embodiments as previously described. In one embodiment, the computing architecture 400 may include or be implemented as part of a system, which will be further described below. At least one computing device and/or the processing circuitries thereof may be configured to provide the software components (e.g., APIs, proxy agent, plugin integrator, plugin interfaces, user interface, etc.) of the service virtualization platform and the functionalities thereof, as set forth above.

As used in this application, the terms "system" and "component" are intended to refer to a computer-related entity, either hardware, a combination of hardware and software, software, or software in execution, examples of which are provided by the exemplary computing architecture 400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 includes a computer 402 having a processor 404, a system memory 406 and a system bus 408. The processor 404 can be any of various commercially available processors, processing circuitry, central processing unit (CPU), a dedicated processor, field-programmable gate array (FPGA), etc.

The system bus 408 provides an interface for system components including, but not limited to, the system memory 406 to the processor 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage medium suitable for storing information. In the illustrated embodiment shown in FIG. 4, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by a HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components.

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 404 through an input device interface 842 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-3 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 5:
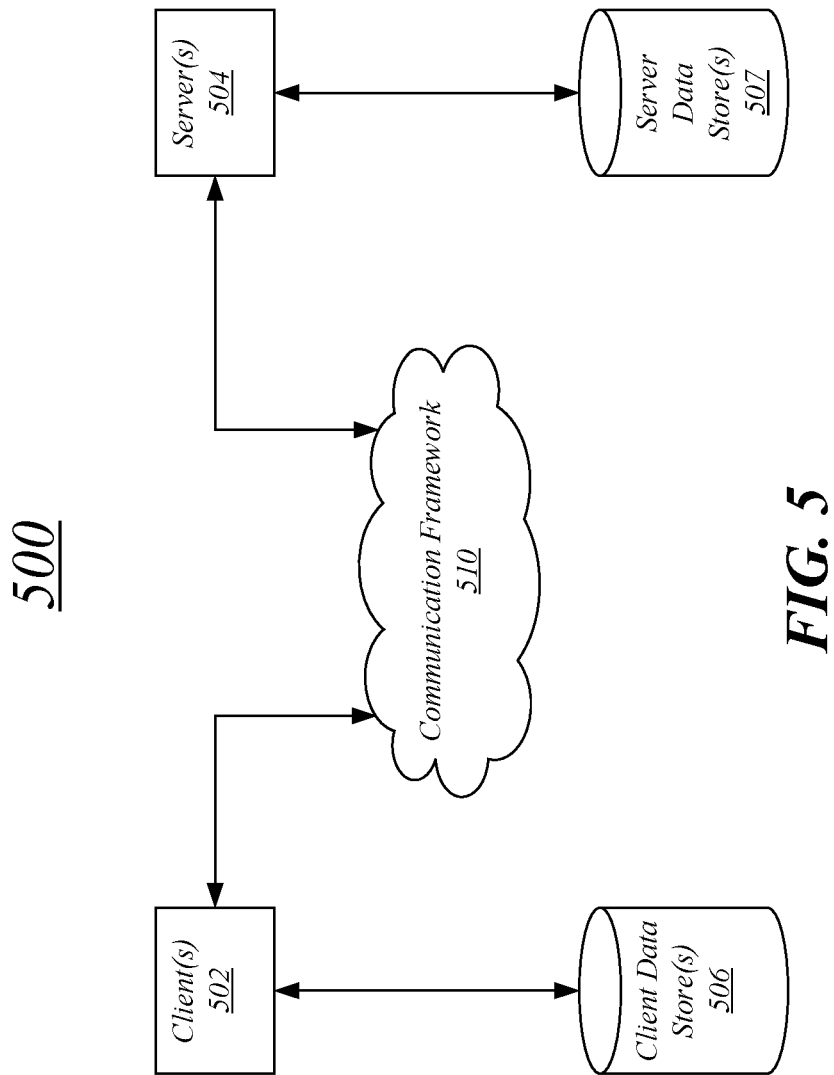
FIG. 5 illustrates an example communications architecture in accordance with one or more embodiments.

FIG. 5 is a block diagram depicting an exemplary communications architecture 500 suitable for implementing various embodiments. For example, one or more computing devices may communicate with each other via a communications framework, such as a network. At least one computing device connected to the network may be a client computing device, such as a desktop computer, laptop, tablet computer, smartphone, etc. The client may be a team or a business unit in an enterprise environment. At least one computing device connected to the network may be a server computer. The server computer or computers may be provisioned in a cloud architecture and may support the various software components (e.g., APIs, proxy agent, plugin integrator, plugin interfaces, user interface, etc.) of the service virtualization platform and the functionalities thereof. In examples, the communication framework 510 may facilitate and support the communications and/or interactions between users, interfaces, test frameworks, and/or applications interfacing with or connecting to the service virtualization platform.

The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500.

As shown in FIG. 5, the communications architecture 500 includes one or more clients 502 and servers 504. The one or more clients 502 and the servers 504 are operatively connected to one or more respective client data stores 506 and server data stores 507 that can be employed to store information local to the respective clients 502 and servers 504, such as cookies and/or associated contextual information.

The clients 502 and the servers 504 may communicate information between each other using a communication framework 510. The communications framework 510 may implement any well-known communications techniques and protocols. The communications framework 510 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 510 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 502 and the servers 504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system for a service virtualization platform, the system comprising:
   at least one networking device; and
   one or more computing devices connected to the at least one networking device, wherein the one or more computing devices comprises:
   a memory to store instructions; and
   processing circuitry, coupled with the memory, operable to execute the instructions, that when executed, cause the processing circuitry to:
   access or provide at least one core application programming interface (API) at a core layer;
   access or provide a plugin integrator at a plugin layer for programmatically interfacing with and integrating one or more virtualization tools via one or more respective plugins;
   access or provide at least one proxy agent;
   create or manage one or more virtual services using the at least one core API; and
   run the one or more virtual services using the at least one proxy agent, and
   wherein the core layer is different from the plugin layer,
   wherein the creation of the one or more virtual services comprises using, accessing, plugging in, and/or integrating via the plugin integrator a predetermined combination of the one or more virtualization tools by a user, and
   wherein the proxy agent runs the one or more virtual services and does not perform the creation and the management of the one or more virtual services.

2. The system of claim 1, wherein the at least one core API is one or more of the following: (i) a representational state transfer (REST) API and (ii) a simple object access protocol (SOAP) API.

3. The system of claim 1, wherein the plugin integrator programmatically interfaces with the at least one core API.

4. The system of claim 1, wherein the plugin integrator does not programmatically interface with the at least one proxy agent.

5. The system of claim 1, wherein the one or more virtualization tools are open-source virtualization tools.

6. The system of claim 1, wherein the management of the one or more virtual services comprises one or more of the following: (i) capturing and recording data, (ii) editing, modifying, or deleting data, (iii) setting a delay, wherein the delay includes a randomized delay and/or a jitter, (iv) entering a mode, wherein the mode includes a simulation mode, a passthrough mode, and/or a record mode, (v) changing the mode, (vi) injecting JavaScript (JS) code, wherein the injection of the JS code dynamically modifies behavior of the one or more virtual services by altering incoming requests and/or outgoing mocked responses, and (vii) deploying the one or more virtual services by a test framework.

7. The system of claim 1, wherein the processing circuitry is further caused to export virtual service data by the at least one core API, and wherein the virtual service data is in JavaScript Object Notation (JSON) format.

8. The system of claim 7, wherein the virtual service data is formattable in Git.

9. The system of claim 1, wherein the processing circuitry is further caused to provide a user interface to design, build, document, and/or test the at least one core API and/or the one or more virtual services.

10. The system of claim 1, wherein the service virtualization platform integrates a continuation-integration/continuation-delivery (CI/CD) pipeline by the at least one core API.

11. The system of claim 1, wherein the running of the one or more virtual services comprises routing a request to at least one port of the one or more virtualization tools by the proxy agent.

12. The system of claim 1, wherein the running of the one or more virtual services is dynamically scalable based at least in part on user load.

13. The system of claim 1, wherein the at least one core API is programatically connected to or interfaced with a distributed relational database and virtual service data from the at least one core API is stored in the distributed relational database, and wherein the processing circuitry is further caused to:
   perform analysis on the virtual service data, and
   modify the one or more virtual services based on the performed analysis.

14. The system of claim 1, wherein the service virtualization platform is cloud native.

15. The system of claim 1, wherein the plugin integrator provides: (i) one or more services for the one or more plugins associated with the one or more virtualization tools to register with the plugin integrator and (ii) one or more protocols for exchanging data with the one or more plugins.

16. An apparatus comprising:
   a memory to store instructions; and
   processing circuitry, coupled with the memory, operable to execute the instructions, that when executed, cause the processing circuitry to:
      access or provide at least one core application programming interface (API) at a core layer;
      access or provide a plugin integrator at a plugin layer for programmatically interfacing with and integrating one or more virtualization tools via one or more respective plugins;
      access or provide at least one proxy agent;
      create or manage one or more virtual services using the at least one core API, wherein the at least one core API programmatically interfaces with the plugin integrator; and
      run the one or more virtual services using only the at least one proxy agent, and
   wherein the core layer is different from the plugin layer,
   wherein the creation of the one or more virtual services comprises using, accessing, plugging in, and/or integrating via the plugin integrator a predetermined combination of the one or more virtualization tools by a user, and
   wherein the proxy agent runs the one or more virtual services and does not perform the creation and the management of the one or more virtual services.

17. The apparatus of claim 16, wherein the management of the one or more virtual services comprises one or more of the following: (i) capturing and recording data, (ii) editing, modifying, or deleting data, (iii) setting a delay, wherein the delay includes a randomized delay and/or a jitter, (iv) entering a mode, wherein the mode includes a simulation mode, a passthrough mode, and/or a record mode, (v) changing the mode, (vi) injecting JavaScript (JS) code, wherein the injection of the JS code dynamically modifies behavior of the one or more virtual services by altering incoming requests and/or outgoing mocked responses, and (vii) deploying the one or more virtual services by a test framework.

18. A non-transitory computer-readable storage medium storing computer-readable program code executable by a processor to:
   generate one or more core application programming interfaces (APIs) at a core layer;
   receive instructions for creating one or more virtual services;
   create, using the one or more core APIs, the one or more virtual services, wherein the one or more core APIs programmatically interface with at least one virtualization tool via a plugin layer;
   receive instructions for running the one or more virtual services;
   run, using at least one proxy agent, the one or more virtual services, wherein the running of the one or more virtual services is performed only by the at least one proxy agent, and
   wherein the core layer is different from the plugin layer,
   wherein the creation of the one or more virtual services comprises using, accessing, plugging in, and/or integrating via the plugin integrator a predetermined combination of the one or more virtualization tools by a user, and
   wherein the proxy agent runs the one or more virtual services and does not perform the creation and the management of the one or more virtual services.

19. The non-transitory computer-readable storage medium of claim 18, further comprising computer-readable program code executable to provide or access a user interface to design, build, document, and/or test the at least one core API and/or the one or more virtual services.

* * * * *